(12) United States Patent
Wilkins et al.

(10) Patent No.: US 9,689,496 B2
(45) Date of Patent: Jun. 27, 2017

(54) AXLE SEAL

(71) Applicants: John Arthur Wilkins, Chicago, IL (US); Austin Yu, Jangxi Province (CN)

(72) Inventors: John Arthur Wilkins, Chicago, IL (US); Austin Yu, Jangxi Province (CN)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/931,909

(22) Filed: Nov. 4, 2015

(65) Prior Publication Data

US 2016/0186863 A1    Jun. 30, 2016

(30) Foreign Application Priority Data

Dec. 25, 2014    (CN) .......................... 2014 1 0842230

(51) Int. Cl.
| | | |
|---|---|---|
| *F16C 33/78* | (2006.01) | |
| *F16C 27/04* | (2006.01) | |
| *F16J 15/16* | (2006.01) | |
| *F16J 15/3224* | (2016.01) | |
| *F16J 15/3248* | (2016.01) | |
| *F16J 15/3232* | (2016.01) | |
| *F02F 11/00* | (2006.01) | |

(52) U.S. Cl.
CPC ....... *F16J 15/3224* (2013.01); *F16C 33/7886* (2013.01); *F16J 15/3232* (2013.01); *F16J 15/3248* (2013.01); *F02F 11/007* (2013.01); *F16C 2226/36* (2013.01); *F16C 2226/40* (2013.01); *F16C 2240/46* (2013.01); *F16C 2360/22* (2013.01)

(58) Field of Classification Search
CPC .. F16J 15/3224; F16J 15/3232; F16J 15/3248; F16F 2226/36; F16C 2360/22; F16C 33/7816; F16C 33/7886; F16C 2226/40; F16C 2240/46
USPC ....... 384/140, 143, 147, 462, 477, 486, 488, 384/490, 607, 282; 277/375, 380, 392, 277/411, 504, 551, 578, 590, 922, 944
See application file for complete search history.

(56) References Cited

U.S. PATENT DOCUMENTS

| | | | | |
|---|---|---|---|---|
| 2,743,950 A | * | 5/1956 | Helfrecht | F16C 33/78 277/561 |
| 3,455,564 A | * | 7/1969 | Dega | F16J 15/322 277/559 |
| 3,871,666 A | * | 3/1975 | Franz | F16J 15/162 277/563 |

(Continued)

*Primary Examiner* — Marcus Charles
(74) *Attorney, Agent, or Firm* — Bryan Peckjian; SKF USA Inc. Patent Dept.

(57) ABSTRACT

An axle seal used to prevent lubricant from leaking between a rotating shaft and a shaft bore. The seal includes: a peripheral connection section reliably connected to an inner edge of the shaft bore; an extensible and retractable adjustment section connected to the peripheral connection section, allowing the seal to make extension and retraction adjustment in a radial direction; and a sealed contact section connected to the inner edge of the extensible and retractable adjustment section and potentially in sealed contact with the surface of the rotating shaft. The seal contains an alignment follower that can synchronously transfer a radial movement of the rotating shaft to the inner edge of the extensible and retractable adjustment section. One application would be an oil seal between a front cover and crankshaft.

10 Claims, 6 Drawing Sheets

(56) References Cited

U.S. PATENT DOCUMENTS

| | | | | |
|---|---|---|---|---|
| 4,053,166 A | * | 10/1977 | Domkowski | F16J 15/3208 277/558 |
| 4,274,641 A | * | 6/1981 | Cather, Jr. | F16J 15/322 277/309 |
| 4,426,094 A | * | 1/1984 | Antonini | F16J 15/3232 277/565 |
| 4,613,143 A | * | 9/1986 | Butler | B29C 43/18 277/559 |
| 4,699,526 A | * | 10/1987 | Sato | F16C 33/7876 277/351 |
| 4,750,748 A | * | 6/1988 | Visser | B63H 23/321 277/561 |
| 4,818,620 A | * | 4/1989 | Pilkington | F16J 15/3228 277/568 |
| 4,844,484 A | * | 7/1989 | Antonini | F16J 15/3224 277/561 |
| 4,893,823 A | * | 1/1990 | Strouse | F16J 15/166 277/437 |
| 4,968,044 A | * | 11/1990 | Petrak | F16J 15/3456 277/380 |
| 5,085,444 A | * | 2/1992 | Murakami | B60G 7/00 277/503 |
| 5,346,230 A | * | 9/1994 | Schumacher | F16J 15/166 277/551 |
| 5,370,404 A | * | 12/1994 | Klein | F16C 27/066 277/572 |
| 5,611,548 A | * | 3/1997 | Dahlhaus | F16J 15/326 277/317 |
| 5,697,710 A | * | 12/1997 | Iida | B21B 31/078 384/473 |
| 6,298,955 B1 | * | 10/2001 | Frost | F16J 3/042 188/72.9 |
| 6,336,638 B1 | * | 1/2002 | Guth | F16J 15/3228 277/500 |
| 6,428,013 B1 | * | 8/2002 | Johnston | F16J 15/3228 277/400 |
| 7,004,471 B2 | * | 2/2006 | Bryde | F16J 15/3228 277/318 |
| 7,648,144 B2 | * | 1/2010 | Sanada | F16J 15/3216 277/551 |
| 7,665,740 B2 | * | 2/2010 | Munekata | F16F 9/362 277/436 |
| 7,887,062 B2 | * | 2/2011 | Dahlheimer | F16J 15/3224 277/572 |
| 8,459,654 B2 | * | 6/2013 | Hatch | F16J 15/3228 277/402 |
| 9,062,773 B2 | * | 6/2015 | Sedlar | F16J 15/3244 |
| 2008/0284110 A1 | * | 11/2008 | Dahlheimer | F16J 15/3224 277/551 |
| 2011/0018209 A1 | * | 1/2011 | Dahlhaus-Preussler | D06F 37/00 277/562 |
| 2011/0221143 A1 | * | 9/2011 | Toth | F16J 15/025 277/549 |

* cited by examiner

AXLE SEAL

CROSS REFERENCE TO RELATED APPLICATION

This is a Non-Provisional Patent Application, filed under the Paris Convention, claiming the benefit of China (CN) Patent Application Number 201410842230.2, filed on 25 Dec. 2014, which is incorporated herein by reference in its entirety.

TECHNICAL FIELD

The present invention relates to an axle seal between the rotating shaft and the shaft bore, which is used to prevent lubricant from leaking between the rotating shaft and the shaft bore.

BACKGROUND ART

In the conventional vehicle engine, as shown in FIG. 1, the crankshaft 2 passes through the front engine cover 3 to provide motive power to the front end accessory drive (abbreviated as FEAD, not shown in the figure) installed at the outside of the front cover 3. When the crankshaft 2 passes through the shaft bore 4 on the front cover 3, the axle seal 1 is needed to provide the engine with sealing protection for preventing the lubricating oil from leaking to the outside from the engine.

In the conventional engine, the front cover 3 is generally made of steel or aluminum stamped plate; both the position and the dimensions of the shaft bore 4 are relatively accurate, so when the crankshaft 2 passes through the shaft bore 4, sealing can be implemented with the use of conventional oil seal. There are two common types of conventional oil seals: one type is the radial lip shaft seal, which uses fluorine rubber material to be in sealed contact with the crankshaft surface through a spring-restrained rubber lip; the other type is the polytetrafluoroethylene (PTFE) seal, which uses the seal lip with a flex section to be in sealed contact with the crankshaft surface through flexural fitting. Regardless of which type it is, it can only tolerate within a certain range the shaft-to-bore misalignment (generally referred to as "static misalignment") between the rotating shaft and the shaft bore as well as the dynamic runout (also referred to as "dynamic misalignment") when the rotating shaft rotates.

With the development of technology, front cover producers hope that plastic material can be used to replace the conventional steel or aluminum material, so as to achieve the objective of reducing noise, lowering weight and reducing cost. However, the replacement of material also brings a challenge to the shaft bore sealing between the crankshaft and the front cover. This is because, in comparison with the metal material, the dimensional tolerance of the front cover made of plastic material is larger; it is more difficult to control the bore position and dimensions thereof in comparison with the metal material, so that it is easy to make the shaft-to-bore misalignment reach or even exceed 1 mm when the crankshaft passes through the front cover. After the temperature rises, the heat distortion of the front cover may also further aggravate such misalignment. When the shaft-to-bore misalignment exceeds a certain range, it will be difficult for the lip of the conventional oil seal to be in full contact with the crankshaft surface, which results in damage to the normal sealing status. The present invention comes into being due to the challenge of this type of new front cover.

SUMMARY OF INVENTION

In order to solve the aforethe technical issue, the present invention provides an axle seal, including: a peripheral connection section that can be reliably connected to the inner edge of the shaft bore; an extensible and retractable adjustment section that is reliably connected to the peripheral connection section and allows the seal to make extension and retraction adjustment in the radial direction; and a sealed contact section that is reliably connected to the inner edge of the extensible and retractable adjustment section and can be in sealed contact with the surface of the rotating shaft. In addition, the axle seal further contains an alignment follower that can synchronously transfer the radial movement of the rotating shaft to the inner edge of the extensible and retractable adjustment section. Here, the radial movement includes but is not limited to the shaft-to-bore misalignment and dynamic runout of the rotating shaft.

The axle seal makes a distinction in working mechanism between the conventional oil seal function and the ability to tolerate the radial movement of the rotating shaft. The conventional seal function is retained through the sealed contact section (such as the rubber and PTFE seal lip), while the ability to tolerate the radial movement of the rotating shaft is implemented through setting up the alignment follower and the extensible and retractable adjustment section.

The various embodiments and beneficial effects of the present invention are described below in detail, in combination with the attached drawings.

DESCRIPTIONS OF THE ATTACHED DRAWINGS

SPECIFIC EMBODIMENTS

For purpose of simplifying the descriptions, in the descriptions below, the side of the seal 1 located at the air (air side) is defined as "the air side", while the side located at the lubricating oil (oil side) is defined as "the oil side". Take FIG. 2 as an example; the axial direction left side of the front cover 3 is the air side, which is also referred to as "the outside"; the axial direction right side is the oil side, which is also referred to as "the inside". This is consistent in spatial terms with the inside and outside concepts when the engine is taken as the reference system.

Figure 1:
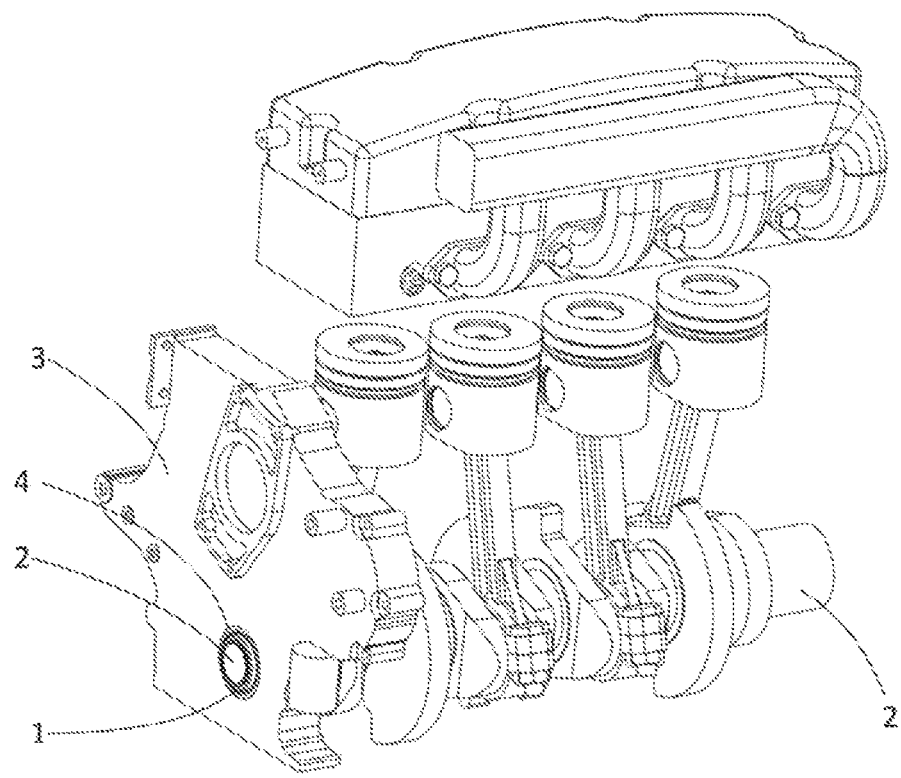
FIG. 1 is the three-dimensional perspective view of the vehicle engine.
Figure 2:
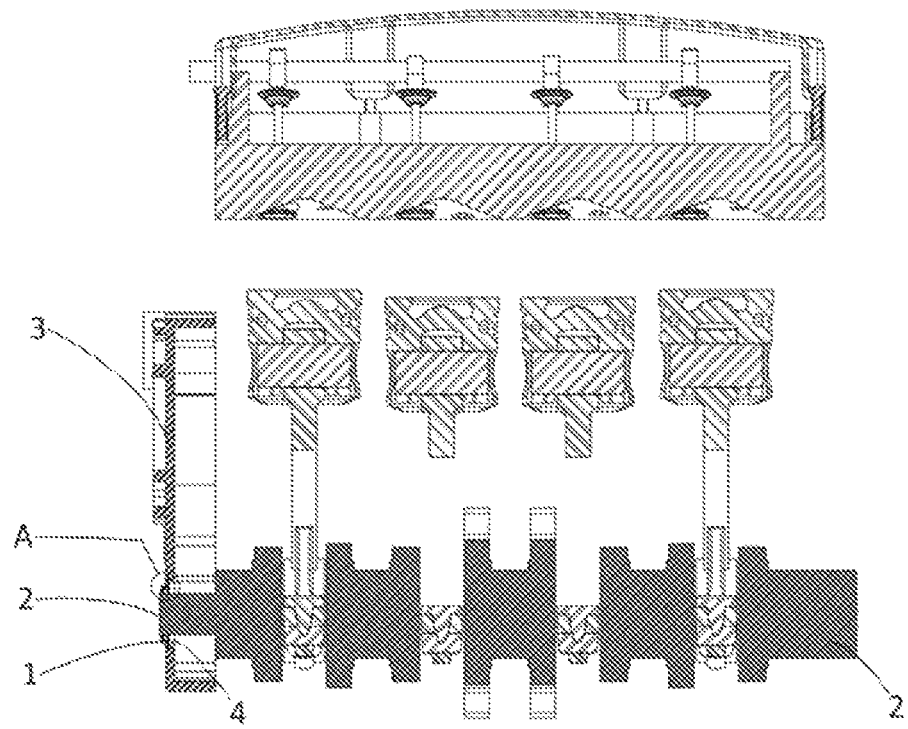
FIG. 2 is the schematic cross section of the vehicle engine.

FIG. 1 and FIG. 2 show, from different angles, the relationship of structure and position between the crankshaft and the front cover in a four-cylinder engine. Specifically, the crankshaft 2 passes through and out of the shaft bore 4 on the front cover 3 of the engine to provide motive power to the front end accessory drive (not shown in the figure) set at the outside of the front cover 3. The axle seal 1 is set up between the crankshaft 2 and the through bore 4, which is used to prevent the lubricating oil from leaking from the shaft bore 4. In other types of engines (such as the V6 engine), a similar relationship also exists between the crankshaft and the front cover, which will not be further mentioned here.

Figure 3:
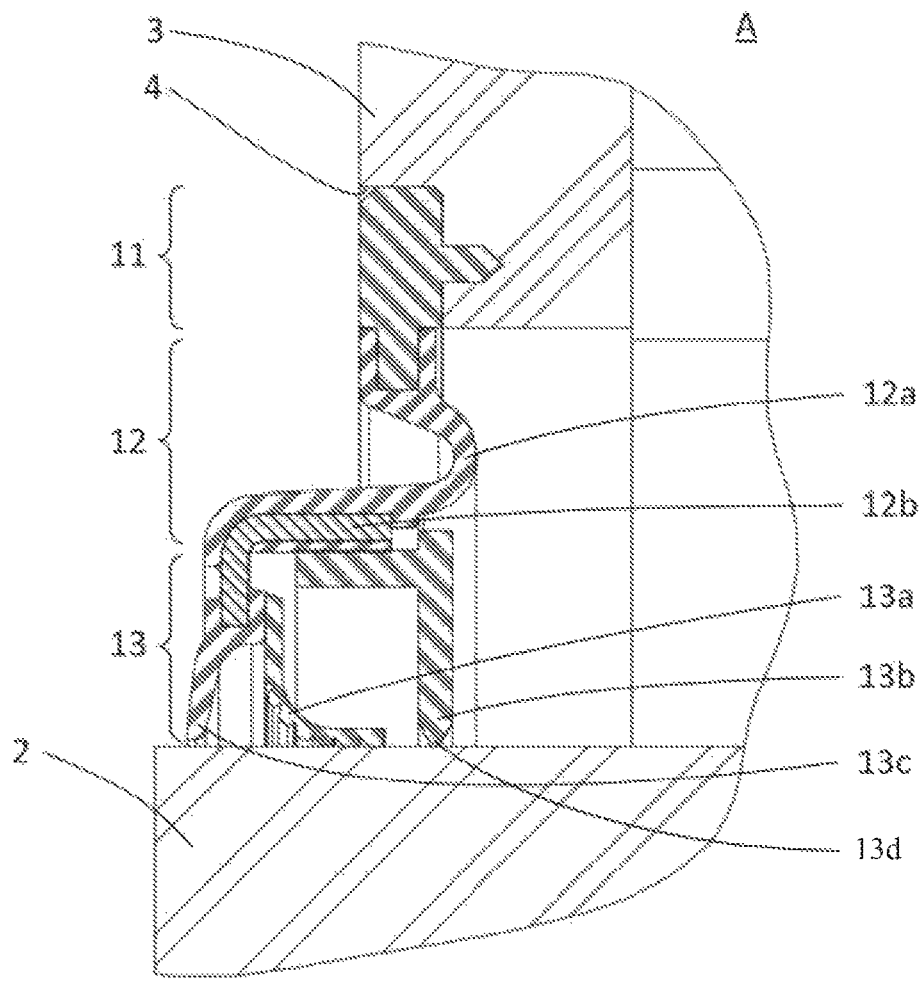
FIG. 3 is the partial enlarged view of Area A in FIG. 2.

FIG. 3 shows the cross section structure of the seal of the present invention in the radial direction in the form of an enlarged view. As shown in the figure, the seal 1 contains along the radial direction, in the order from the outside to the inside: the peripheral connection section 11, the extensible and retractable adjustment section 12 and the shaft contact section 13. The shaft contact section 13 further contains a series of parts in contact with the surface of the crankshaft 2, including but not limited to the sealed contact section 13a, the alignment follower 13b and the dust prevention section 13c. In practical application, the dust prevention section 13c is not a must, and the needs of operating conditions may be considered to appropriately make a decision on its use or not.

As shown in FIGS. 3-6, the peripheral connection section 11 may be an independent annular insert in form, and may also be a part of the overall peripheral edge of the seal (not shown in the figures). The peripheral connection section 11 is reliably connected to the inner edge of the shaft bore 4 to make sure that the seal is reliably fixed to the shaft bore 4. In the conventional oil seal, metal or rubber material is generally used for the peripheral connection section, which is generally referred to as "the metal outside diameter" or "the rubber outside diameter" in the industry, and is fixed and connected to the inner edge of the shaft bore of metal material through press fit. In the present invention, because plastic material is used instead for the front cover 3, the seal must also ensure that the peripheral connection section thereof is reliably connected to the inner edge of the shaft bore of plastic material.

Figure 4:
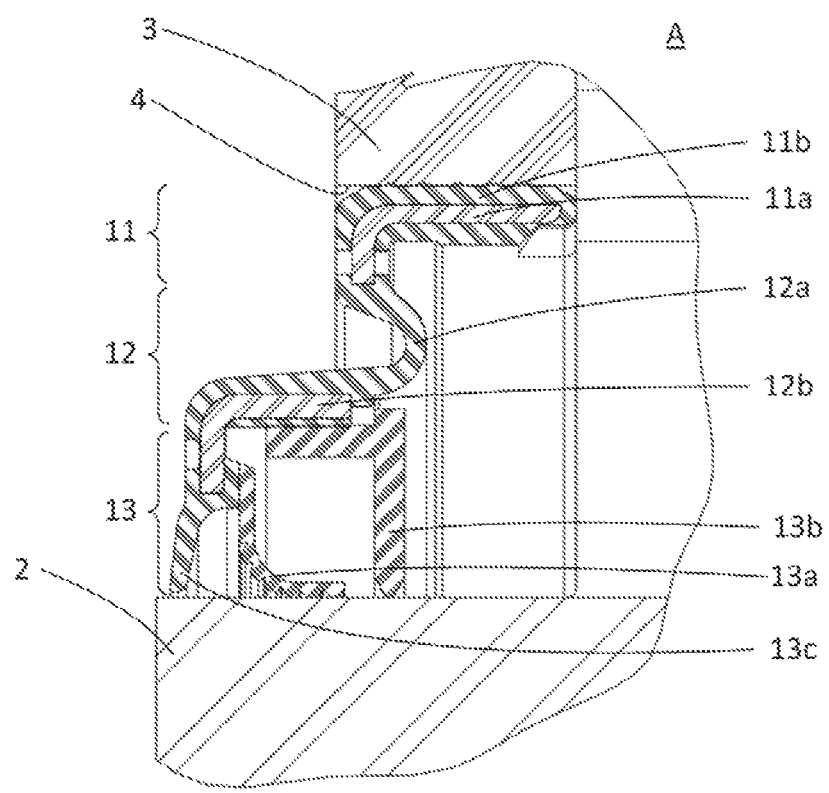
FIG. 4 is the partial schematic cross section of the seal of the present invention under one embodiment.
Figure 5:
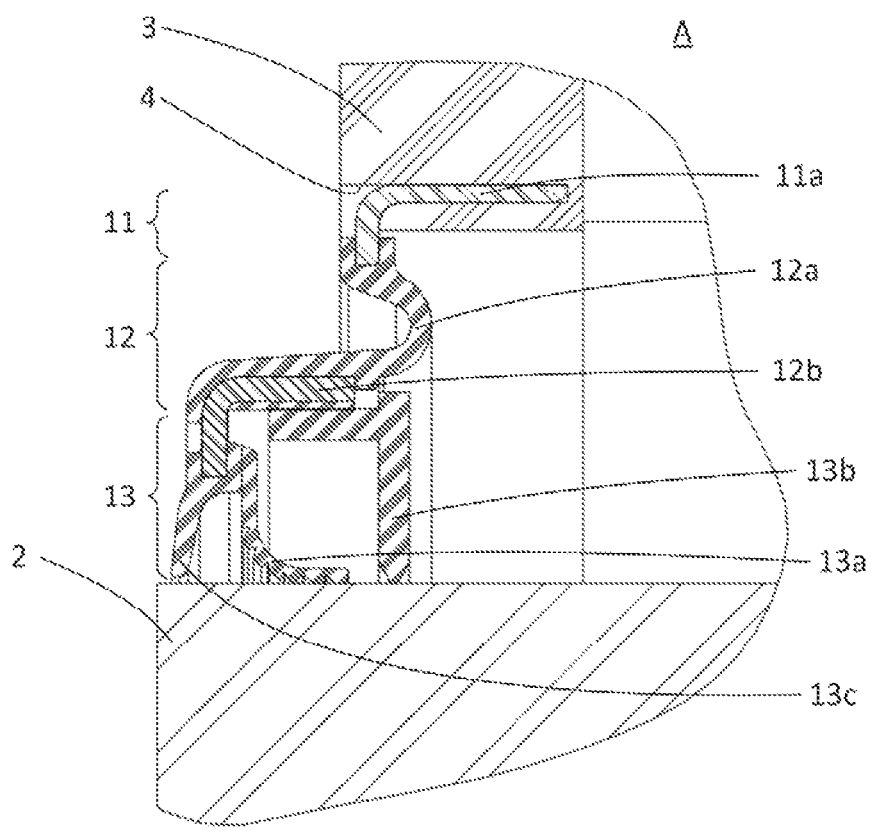
FIG. 5 is the partial schematic cross section of the seal of the present invention under another embodiment.

As an embodiment, which is as shown in FIG. 3, plastic material may be used for the peripheral connection section 11 of the seal, which is reliably connected to the inner edge of the shaft bore of plastic material by way of adhesive joining or welding (such as ultrasonic welding or friction welding). As another embodiment, which is as shown in FIG. 4, the peripheral connection section 11 may be jointly composed of the metal material 11a and the rubber material 11b. Under this embodiment, the rubber material 11b may envelope and be attached to the outside of the metal material 11a, which is reliably connected to the inner edge of the shaft bore of plastic material by way of adhesive joining. As a further embodiment, which is as shown in FIG. 5, the metal material 11a may also be used for the peripheral connection section 11, which is reliably connected to the inner edge of the shaft bore of plastic material through plastic thermal welding technique. The so-called plastic thermal welding technique refers to the connection technique by which the plastic is heated and softened, and is then made to be bonded with the metal part through punched deformation.

In the embodiments as shown in FIGS. 3-6, the peripheral connection section 11 is reliably connected along the radial direction to the extensible and retractable adjustment section 12 of the inside, and the latter brings into being along the radial direction at least one convolute section 12a characteristic of convolution. The convolute section 12a uses an approximate U-shape structure, which is made of a pliable material such as rubber, and provides the extensible and retractable adjustment ability for the seal mainly in the radial direction. It is necessary to point out that the extensible and retractable adjustment section 12 is not just limited to the use of the U-shape convolute structure; any other extensible and retractable material or easily deformable geometric structure may be appropriately used so long as it allows the seal to make extension and retraction adjustment to a relatively large extent in the radial direction.

The extensible and retractable adjustment section 12 provides roughly two functions for the seal 1: firstly, for the shaft-to-bore misalignment, the extensible and retractable adjustment section 12 can deform and allow the rotating shaft to deviate from the circle center of the shaft bore to a greater extent; secondly, for the dynamic runout of the rotating shaft, even if the extent exceeds the convention, the extensible and retractable adjustment section is also able to follow dynamically, and deform in time to be adapted to the radial runout of the rotating shaft. By the way, it needs to be pointed out that the extensible and retractable adjustment section 12 characterized by a convolute structure has never been applied to a situation of dynamic sealing. In the present invention, this convolute structure not only allows a greater extent of shaft-to-bore misalignment, but is also adapted to a greater extent of rotating shaft dynamic runout.

As shown in FIGS. 3-6, the extensible and retractable adjustment section 12 is connected to the shaft contact section 13 at the inner edge 12b in the radial direction. As mentioned previously, the shaft contact section 13 includes but is not limited to the sealed contact section 13a, the alignment follower 13b and the dust prevention section 13c. As a preferred embodiment, local rigid design is at least used at the position where the inner edge 12b of the extensible and retractable adjustment section 12 is connected to the shaft contact section 13, so as to make sure that the radial extension and retraction of the seal 1 mainly occurs at the position where the convolute section 12a is located. The rigid part of the inner edge 12b may be directly made of a hard material, and may also be jointly composed of a hard material such as a metallic framework and a soft material such as rubber.

For purpose of illustration, in the parts as contained in the shaft contact section 13, the sealed contact section 13a is made of the PTFE seal lip that can flex and deform. As mentioned previously, the flexural part of this seal lip brings into being a sealed contact with the surface of the rotating shaft, which is used to prevent the lubricating oil from leaking from the shaft bore. It is easily understandable that other forms of sealed contact sections, such as the radial lip shaft seal, may all be applied in the present invention so long as they can prevent the lubricating oil from leaking from the crankshaft surface.

In FIGS. 3-5, the inner edge 12b of the extensible and retractable adjustment section 12 is set up with an alignment follower 13b roughly in the shape of a ring. From the perspective of the form, the alignment follower 13b either may be an independent component that is reliably connected to the inner edge 12b of the extensible and retractable adjustment section 12, or may be a part of the overall structure of the inner edge 12b of the extensible and retractable adjustment section 12. In the latter situation, for example, the alignment follower 13b and the inner edge 12b of the extensible and retractable adjustment section 12 bring into being an integrated annular plastic component (not shown in the figures). In this way, the connection process between the parts may be omitted, which is good for reducing cost. In the embodiments as shown in FIGS. 3-5, the cross section of the alignment follower 13b is roughly in an L shape, which may conserve material and reduce cost on the one hand, and may also reduce its own weight on the other, which is favorable for enhancement of the performance of alignment following.

In the ideal situation, the aforethe annular alignment follower 13b is best to be able to stay in "formal contact" with the surface of the crankshaft 2. The so-called "formal contact", theoretically speaking, refers to implementation of zero-distance contact between two objects without resulting in interactive effect of any force. In practical application, the alignment follower 13b may bring into being the close fitting with the surface of the crankshaft 2 at the radial clearance as permitted by the minimum tolerance design (tolerance range) (close fitting at minimum shaft clearance). This close fitting may be described using the following mathematical relation: assuming that the outside diameter of the crankshaft 2 is D, the inside diameter tolerance range of the alignment follower 13b is ±σ, then the design value of the inside diameter of the alignment follower 13b may not be lower than D+σ at the minimum, and if otherwise, it may result in a situation in which the alignment follower 13b "tightly hoops" the surface of the crankshaft 2 to hinder the latter from free rotation. Obviously, the purpose of using the radial clearance as permitted by the minimum tolerance design is to make sure that the alignment follower 13b is able to synchronously follow the crankshaft at a radial clearance as small as possible, and at the same time, to avoid hindering the rotation of the latter. As can be seen from the aforethe purpose, the alignment follower 13b is actually a radial displacement transfer device, which is used to synchronously transfer the radial movement (including static misalignment and dynamic runout) of the crankshaft 2 to the inner edge 12b of the extensible and retractable adjustment section 12.

As illustrated in FIG. 3, the alignment follower may include a radially innermost portion 13d having a frusto-conical shape in cross-section. The radially innermost portion 13d may be annular. However, the radially innermost portion 13d may instead comprise of a plurality of protuberances. As an embodiment for close fitting, the alignment follower 13b may also bring into being a 3-point close fitting with the surface of the crankshaft 2 at the position of 3 protuberances on the inner surface thereof (3-point minimum clearance mating with the shaft). The so-called 3-point close fitting refers to the situation in which the radially innermost portion 13d comprises three protuberances on the inner surface of the alignment follower 13b, and the radial clearance as permitted by the minimum tolerance design as mentioned previously comes into being between the three protuberances and the surface of the crankshaft. The replacement of the close fitting of the entire inner surface with the 3-point close fitting can simplify the process and reduce the cost without losing the displacement transfer accuracy.

Figure 6:
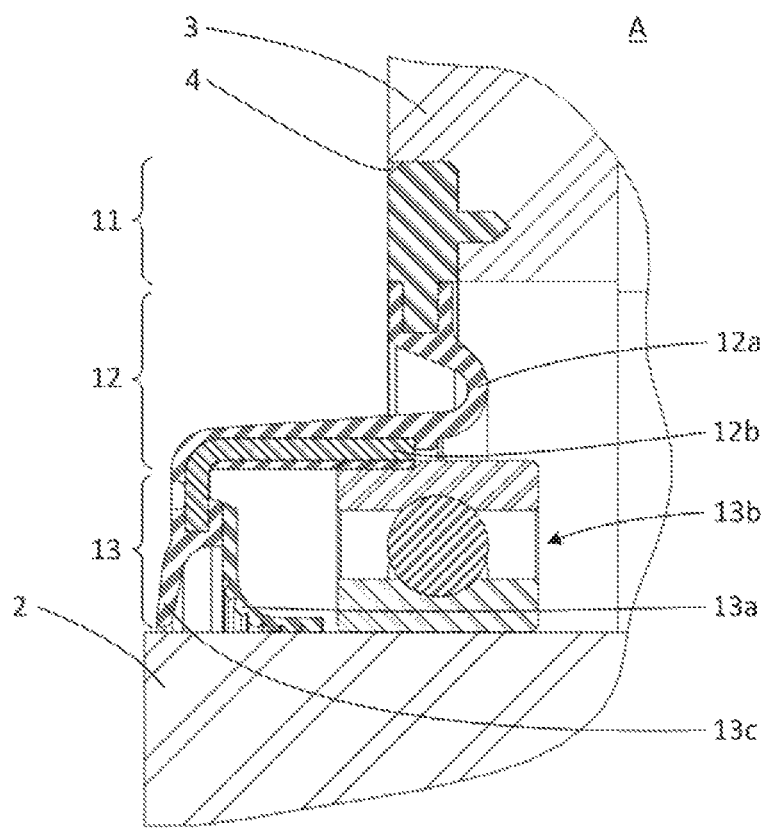
FIG. 6 is the partial schematic cross section of the seal of the present invention under a further embodiment.

As another embodiment, which is as shown in FIG. 6, the rolling bearing may also be used for the alignment follower 13b. The inner ring of the bearing is in press fit with the surface of the crankshaft 2, while the outer ring is in press fit with the inner edge 12b of the extensible and retractable adjustment section 12. In the situation of zero clearance of the inside, the bearing can implement accurate transfer of radial displacement, so as to effectively remove the unfavorable impact of the minimum clearance on synchronous following in close fitting. In addition, the characteristic of the bearing is that it can turn sliding friction into rolling friction, so that it can effectively reduce the friction between the alignment follower and the crankshaft.

In the aforethe embodiment, the seal 1 is used to prevent lubricating oil from leaking from the inside (the oil side) to the outside (the air side) of the engine along the crankshaft 2. In this situation, the alignment follower 13b is best to be set as facing the inside of the engine in the axial direction, and the sealed contact section 13a is located at the outside of the alignment follower 13b in the axial direction. In other words, in the leaking direction of lubricating oil, the alignment follower 13b is preferably located at the upstream of the sealed contact section 13a. This is because the alignment follower 13b located at the inside is able to benefit from the lubricating condition inside the engine, which makes it easy to reduce friction between it and the crankshaft 2. Naturally, as the previously, the outside of the sealed contact section 13a may be set up with the dust prevention section 13c, which is used to block dust and impurities.

As may be seen from the descriptions above, although the present invention is brought forth for the specific issue of the plastic front engine cover, it may obviously be applied to the situation in which the shaft-to-bore misalignment and/or dynamic runout of the metal cover exceed(s) the conventional extent. In many applications, clients expect less control on the tolerance of the shell body, or increase in the distance between the shaft bore and the bearing, and all these may lead to increase in the extent of shaft-to-bore misalignment and dynamic runout. From the perspective of more extensive significance, the present invention is applicable to all such sealed fittings between the rotating shaft and the shaft bore where the static misalignment and/or dynamic misalignment exceed(s) the conventional extent. In addition, although the foregoing descriptions only target the conventional engines that use oil lubrication, they are obviously also applicable to any form of sealing between any form of the shaft and the bore that use grease lubrication.

Those of ordinary skill in the art should understand that any change and improvement to the aforesaid seal fall within the scope of protection for the present invention so long as they meet the limitations of the attached claims.

What is claimed is:

1. An axle seal between a rotating shaft and a shaft bore, wherein the axle seal is used to prevent lubricant from leaking between the rotating shaft and the shaft bore, the axle seal includes:
   a peripheral connection section adapted to be reliably connected to an inner edge of the shaft bore;
   an extensible and retractable adjustment section connected to the peripheral connection section and which allows the axle seal to make extension and retraction adjustments in a radial direction, one of a metallic and a plastic material forms at least part of an inner edge of the extensible and retractable adjustment section;
   a sealed contact section connected to the inner edge of the extensible and retractable adjustment section and adapted to be in sealed contact with a surface of the rotating shaft; and
   an alignment follower adapted to synchronously transfer a radial movement of the rotating shaft to the inner edge of the extensible and retractable adjustment section,
   wherein the one of the metallic and the plastic material forms an L-shape wherein an axially extending portion of the L-shape forms the at least part of the inner edge of the extensible and retractable adjustment section and a radially extending portion of the L-shape extends radially inward from an outer axial end of the axially extending portion, wherein a first maximum diameter of the axially extending portion of the L-shape is greater than both a second maximum diameter of the sealed contact section and a third maximum diameter of the alignment follower, and wherein the alignment follower is located axially inward from the sealed contact section such that no sealing lip is located axially inward with respect to the alignment follower.

2. The axle seal of claim 1, the alignment follower further comprising one of:
   a first annular structure, connected to the inner edge of the extensible and retractable adjustment section wherein a first radially innermost surface of the first annular structure is entirely annular and in a free state is located within a tolerance range of a diameter of the rotating shaft, or
   a second annular structure connected to the inner edge of the extensible and retractable adjustment section, wherein a second radially innermost surface of the second annular structure has at least one annular portion located at a greater radial distance from the rotating shaft than the tolerance range, and wherein a plurality of protuberances extend inwardly from the second radially innermost surface of the second annular structure such that a radially inner portion of the plurality of protuberances are configured in the free state to have a radial distance from the rotating shaft that is less than or equal to the tolerance range.

3. The axle seal of claim 2, wherein the alignment follower comprises the second annular structure having three protuberances that extend in a frustoconical shape from the second radially innermost surface.

4. The axle seal of claim 2, wherein the alignment follower is formed of the plastic material.

5. The axle seal of claim 1, wherein the alignment follower uses a rolling bearing to transfer radial displacement; and
   an inner ring of the rolling bearing brings into being a press fit with the surface of the rotating shaft, while an outer ring of the rolling bearing brings into being a press fit with the inner edge of the extensible and retractable adjustment section.

6. The axle seal of claim 1, wherein
   the inner edge comprises the one of the plastic and the metal material and an elastomer material.

7. The axle seal of claim 1, wherein the inner edge of the extensible and retractable adjustment section further comprises a dust prevention lip, wherein the dust prevention lip is located at an outside of the sealed contact section in an axial direction.

8. The axle seal of claim 1, wherein one of a plastic, a rubber or a metal material is used for the peripheral connection section,
   wherein the peripheral connection section is connected to the inner edge of the shaft bore formed of plastic material through one of
   a) an adhesive joining, or
   b) a welding process.

9. The axle seal of claim 1, wherein the extensible and retractable adjustment section at least locally uses one of:
   a) an extensible and retractable material, or
   b) a U-shape structure,
   wherein the extensible and retractable adjustment section provides the extensible and retractable adjustment ability for the axle seal mainly in a radial direction.

10. The axle seal of claim 1, wherein the extensible and retractable adjustment section comprises a first elastomer material and the sealed contact section is formed of a second material, wherein the first elastomer material and the second material are separated such that they do not directly contact each other.

* * * * *